(12) United States Patent
Lim (10) Patent No.: US 9,863,497 B2
(45) Date of Patent: Jan. 9, 2018

(54) ANTI-VIBRATION WHEEL FOR AUTOMOBILE

(71) Applicant: GT C&T Corporation, Gwangju-si (KR)

(72) Inventor: Chae-Hong Lim, Gwangju-si (KR)

(73) Assignee: GT C&T Corporation, Gwangju-si (KR)

( * ) Notice: Subject to any disclaimer, the term of this patent is extended or adjusted under 35 U.S.C. 154(b) by 148 days.

(21) Appl. No.: 14/945,788

(22) Filed: Nov. 19, 2015

(65) Prior Publication Data

US 2017/0108074 A1      Apr. 20, 2017

(30) Foreign Application Priority Data

Oct. 20, 2015   (KR) .................... 10-2015-0145842

(51) Int. Cl.
*F16F 15/12*   (2006.01)
*B60B 1/06*    (2006.01)
(Continued)

(52) U.S. Cl.
CPC ............ *F16F 15/1202* (2013.01); *B60B 1/06* (2013.01); *B60B 3/00* (2013.01); *B60B 7/00* (2013.01);
(Continued)

(58) Field of Classification Search
CPC .......... F16F 15/1202; B60B 1/06; B60B 3/00; B60B 21/02; B60B 7/00; B60B 2900/131; B60B 7/066; B60B 7/04; B60B 7/065; B60B 21/026; B60B 21/028; B60B 21/04; B60B 21/10; B60B 21/102; B60B 21/108
(Continued)

(56) References Cited

U.S. PATENT DOCUMENTS 6,106,075 A  *  8/2000  Suenaga ................... B60B 1/08
                                                   152/381.6
6,325,462 B1    12/2001  Hummel et al.
(Continued)

FOREIGN PATENT DOCUMENTS

JP    2004-082810 A    3/2004
JP    2005-271766 A   10/2005
(Continued)

*Primary Examiner* — S. Joseph Morano
*Assistant Examiner* — Jean Charleston
(74) *Attorney, Agent, or Firm* — Law Office of Albert Wai-Kit Chan, PLLC (57) ABSTRACT

There is provided an anti-vibration wheel for an automobile, comprising: a disk member connected to an axle hub with a rim member extending from a circumferential edge of the disk member for mounting a tire, the rim member further having: an outer bead seat positioned at an outer end of the rim member where an outer bead of the tire sits, an inner bead seat positioned at an inner end of the rim member where an inner bead of the tire sits, and a well portion which is inclined and extends between the outer bead seat and the inner bead seat, with an outer well portion extending from the outer bead seat and an inner well portion extending from the outer well portion, with the thickness of the outer well portion being greater than the thickness of the inner bead seat which is greater than the thickness of the inner well portion.

6 Claims, 6 Drawing Sheets

(51) Int. Cl.
  *B60B 3/00* (2006.01)
  *B60B 7/00* (2006.01)
  *B60B 21/02* (2006.01)
  *B60B 7/04* (2006.01)
  *B60B 7/06* (2006.01)
  *B60B 7/08* (2006.01)
  *B60B 3/02* (2006.01)
  *B60B 3/10* (2006.01)

(52) U.S. Cl.
  CPC ............... *B60B 7/04* (2013.01); *B60B 7/065* (2013.01); *B60B 7/08* (2013.01); *B60B 21/02* (2013.01); *B60B 3/02* (2013.01); *B60B 3/10* (2013.01); *B60B 2900/131* (2013.01); *B60B 2900/133* (2013.01)

(58) Field of Classification Search
  USPC ..... 301/101, 37.102, 37.107, 37.108, 37.109
  See application file for complete search history.

(56) References Cited

U.S. PATENT DOCUMENTS

| | | | |
|---|---|---|---|
| 6,460,938 B1* | 10/2002 | Baumgarten | B60B 3/02 301/37.11 |
| 2005/0280309 A1* | 12/2005 | Tanno | B60B 3/02 301/95.109 |
| 2010/0052413 A1* | 3/2010 | Kermelk | B21D 53/30 301/65 |
| 2014/0254821 A1* | 9/2014 | Boyce | B60Q 1/326 381/86 |
| 2014/0306510 A1* | 10/2014 | Thomas | B60B 7/04 301/37.107 |

FOREIGN PATENT DOCUMENTS

| | | |
|---|---|---|
| JP | 2007-186150 A | 7/2007 |
| KR | 10-2007-0053386 A | 5/2007 |
| WO | 2000/076786 | 12/2000 |

* cited by examiner

ANTI-VIBRATION WHEEL FOR AUTOMOBILE

CROSS-REFERENCE TO RELATED APPLICATION

This application claims the benefit of Korean Patent Application No. 10-2015-0145842, filed on 20 Oct. 2015, the disclosure of which is hereby incorporated herein by reference in its entirety.

BACKGROUND OF THE INVENTION

Field of the Invention

The present invention relates to an anti-vibration wheel for an automobile and more particularly, to an anti-vibration wheel for an automobile to improve riding comport by attenuating noise and vibration from the surface of a road during the driving of the automobile.

Description of the Related Art

In general, automobile wheels are made of steel or aluminum. This kind of a wheel is secured to a wheel hub having a brake drum or a brake disc by a round head screw or conical head screw.

To improve the fuel-efficiency of an automobile by decreasing the weight of the automobile, aluminum which is a light material has been used for an automobile wheel. Further, a technology to structurally lighten the weight has been also developed.

Usually, when a wheel is designed, it is considered to primarily satisfy the strength requirements. The structures, such as the thicknesses and designs of a hub mounting portion and a spoke portion of a wheel, have been designed to satisfy the minimum required strength of the wheel. Then, a process for secondary weight lightening (decrease of weight) has been performed inside the hub mounting portion and the spoke portion of the wheel to improve the fuel-efficiency.

However, as the wheel weight has been lightened through the aforementioned ways, the stiffness becomes insufficient, causing vibration and noise of the wheel during the driving of the automobile. To prevent these problems, casting thickness is again provided inside the hub mounting portion and the spoke portion of the wheel. Even the entire shape of the wheel is thickened, thereby increasing the unnecessary stiffness rather than the minimum required strength. This again increases the weight and therefore, it restricts the improvement of fuel-efficiency.

Korean Patent Published Application No. 10-2006-0044653 (hereinafter referred to as 'Reference 1') discloses a technology to decrease weight and block noise by forming a hollow chamber in a rim. The technology of forming the hollow chamber in the rim and spokes is disclosed in not only Reference 1 but also Korean Patent Published Application Nos. 10-2007-0053386 and 10-1999-0062973. The method of forming the hollow chamber has the effect of reducing weight and absorbing noise but it has a problem in that durability is weakened.

Korean Patent Published Application No. 10-2007-0053386 (hereinafter referred to as 'Reference 2') discloses a technology to absorb noise and vibration by forming a hollow chamber in a rim and filling it with an aluminum foam core. The technology of forming the hollow chamber in the rim and spokes and filling it with the foam core has a better effect of absorbing noise in comparison with Reference 1 but a less effect in reducing weight.

Figure 1:
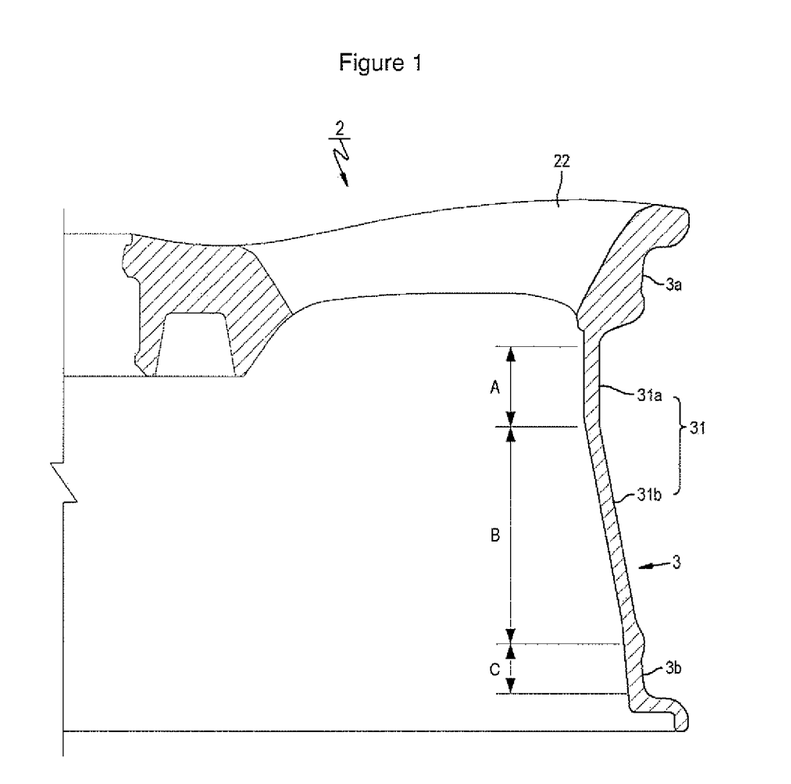
FIG. 1 is an enlarged view of a rim member in the conventional wheel for an automobile.
Figure 2:
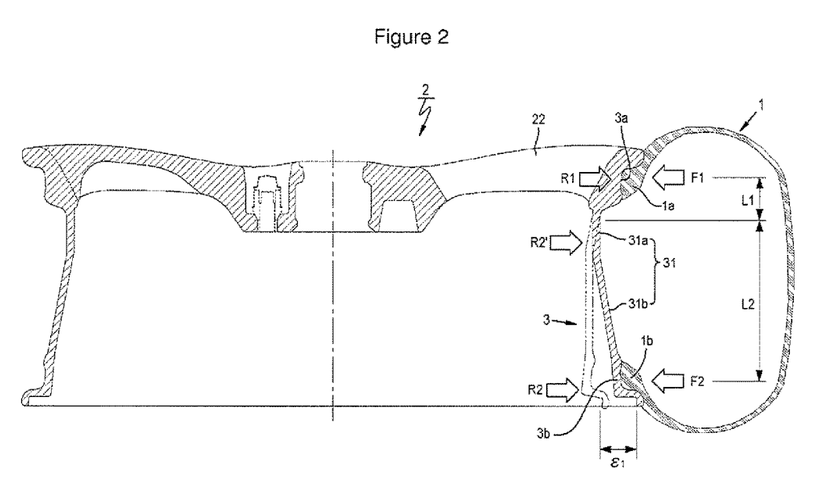
FIG. 2 shows the forces acting in the rim member of the conventional wheel for an automobile.

As shown in FIG. 1 and FIG. 2, the conventional wheel for an automobile includes a disk member 2 with a rim member 3 extending in one direction from the outer circumferential edge of the disk member 2. A tire 1 is mounted on the outside surface of the rim member 3. That is, the tire 1 includes an outer bead 1a in its one end and an inner bead 1b in its other end. The outer bead 1a is secured at an outer bead seat 3a of the rim member 3 forming the outside of the disk member 2. The inner bead 1b is secured at an inner bead seat 3b formed at a free end of the rim member 3.

In the rim member 3, a well portion 31 extending from the outer bead seat 3a protruding from the disk member 2 is formed to be different from the inner bead seat 3b in thickness. The well portion 31 includes an outer well portion 31a and an inner well portion 31b. The outer well portion 31a extends from the outer bead seat 3a. The inner well portion 31b is offset and inclined from the outer well portion 31a outward. The inner bead seat 3b extends from the inner well portion 31b.

The thickness of the well portion 31 and the thickness of the inner bead sheet 3b are formed differently. The thickness C of the inner bead seat 3b where the inner bead 1b of the tire 1 sits is greater than the thickness A of the outer well portion 31a, which extends from the outer bead sea 3a protruding from the disk member 2, which is greater than the thickness B of the inner well portion 31b between the outer well portion 31a and the inner bead seat 3b (C>A>B).

The above-mentioned conventional wheel for an automobile receives the load corresponding to the weight of the automobile through the surface of a road during the driving of the automobile. The loads F1, F2 transferred to the wheel are transferred through the both beads 1a, 1b of the tire 1 as shown in FIG. 2.

However, as shown in FIG. 2, the loads F1, F2 transferred through the tire 1 are applied to the outer bead seat 3a of the rim member 3 through the outer bead 1a of the tire 1 and the inner bead seat 3b of the rim member 3 through the inner bead 1b of the tire 1, respectively. In the outer bead seat 3a and inner bead seat 3b of the rim member 3, reaction forces R1, R2 thereto act, respectively.

Specially, the reaction force R2 to the load F2 applied to the inner bead seat 3b of the rim member 3 acts as being transferred to reaction force R2' of the outer well portion 31a which has one end fixed to the disk member 2 and therefore which functions as a cantilever.

Therefore, as for the load F1 applied to the outer bead seat 3a, the reaction force R1 acts straightly in the opposite direction to the load F1, playing a role of action and reaction. However, as for the load F2 applied to the inner bead seat 3b, since the reaction force R2 to the load F2 is transferred to the reaction force R2' of the outer well portion 31a to act, the amount of deformation $\epsilon 1$ occurs in the inner bead seat 3b. Since the thickness A of the outer well portion 31a is relatively thinner than the thickness C of the inner well portion 31b and therefore the support surface as a fixed end is small, the deformation is generated from the fixed end of the outer well portion 31a and therefore the amount of overall deformation $\epsilon 1$ is big. The vibration corresponding to the amount of deformation $\epsilon 1$ is transferred to a hub (not shown) of the automobile through a spoke portion 22 of the wheel, to generate vibration and noise of the automobile as they are.

Korean Patent Published Application No. 10-2006-0044653 (hereinafter referred to as 'Reference 1') discloses a technology to decrease weight and block noise by forming a hollow chamber in a rim. The technology of forming the hollow chamber in the rim and spokes is disclosed in not only Reference 1 but also Korean Patent Published Application No. 10-2007-0053386 and 10-1999-0062973. The method of forming the hollow chamber has the effect of reducing weight and absorbing noise but it has a problem in that durability is weakened.

Korean Patent Published Application No. 10-2007-0053386 (hereinafter referred to as 'Reference 2') discloses a technology to absorb noise and vibration by forming a hollow chamber in a rim and filling it with an aluminum foam core. The technology of forming the hollow chamber in the rim and spokes and filling it with the foam core has a better effect of absorbing noise in comparison with Reference 1 but a less effect in reducing weight.

The aforementioned automobile wheels and the technology thereof are discussed in detail in 1: Korean Patent Application No. 2006-0044653; 2: Korean Patent Application No. 2007-0053386; and 3: Korean Patent Published Application No. 10-1999-0062973. These publications are hereby incorporated by reference in their entireties into this application to fully illustrate the state of the art.

SUMMARY OF THE INVENTION

Therefore, it is an object of the present invention to solve the above problems and to provide an anti-vibration wheel for an automobile, which is structured by differentiating the thickness of a well portion and the thickness of an inner bead seat which form a rim member, to decrease and minimize vibration and noise transferred to the automobile.

It is an another object of the present invention to provide an anti-vibration wheel for an automobile, which is structured by inclining an inner well portion of the well portion of the rim member at two positions, to minimize the amount of deformation in the well portion and the inner bead seat.

It is an another object of the present invention to provide an anti-vibration wheel for an automobile, which is structured by including a vibration damping unit in a spoke portion of the wheel, to attenuate the vibration and noise transferred to an automobile body.

In accordance with an embodiment of the present invention, there is provided an anti-vibration wheel for an automobile, comprising: a disk member connected to an axle hub with a rim member extending from a circumferential edge of the disk member for mounting a tire, the rim member further having: an outer bead seat positioned at an outer end of the rim member where an outer bead of the tire sits, an inner bead seat positioned at an inner end of the rim member where an inner bead of the tire sits, and a well portion which is inclined and extends between the outer bead seat and the inner bead seat, with an outer well portion extending from the outer bead seat and an inner well portion extending from the outer well portion, with the thickness of the outer well portion being greater than the thickness of the inner bead seat which is greater than the thickness of the inner well portion.

The inner well portion is formed to be inclined outward from the outer well portion and comprises a first incline portion which is inclined outward from the outer well portion and a second incline portion which is further inclined outward from the first incline portion, and an inclination angle of the first incline portion being greater than an inclination angle of the second incline portion.

The anti-vibration wheel for an automobile further comprises: an outside cap attachably/detachably connected to an outside surface of a spoke portion connecting a hub mounting portion of the disk member connected to the axle hub and the rim member; and an outside vibration damping plate provided to the outside cap to be in contact with the spoke portion, to dampen vibration.

The outside vibration damping plate is formed such that the thickness gradually increases from one end to the other end, where one end is thicker relative to the opposite end which is thinner, and the outside vibration damping plate is positioned such that the thicker end is positioned towards the rim member and the thinner end is positioned towards the hub mounting portion.

The outside vibration damping plate includes a cavity spaced apart from the spoke portion on its surface facing the spoke portion, and the spoke portion includes a through hole being operatively connected to the cavity of the outside vibration damping plate.

The anti-vibration wheel for an automobile further comprises: a side cap attachably/detachably connected to an inside surface of a decorative open space formed two adjacent spoke portions of the disk member; and a side vibration damping plate provided to the side cap to be in contact with the inside surface of the decorative open space, to dampen vibration.

The anti-vibration wheel for an automobile further comprises: a damper rubber provided to be in contact with an inside surface of the spoke portion of the disk member, and the damper rubber includes a through hole to be aligned with and operatively connected to the through hole of the spoke portion.

Advantageous Effects of the Invention

According to the anti-vibration wheel for an automobile, the well portion and inner bead seat of the rim member are structured to be different from each other in thickness and the inner well portion of the rim member is formed to be inclined at two positions, to minimize the amount of deformation of the well portion and the inner bead seat and therefore to decrease the vibration and noise transferred to the automobile, to improve the riding comfort.

Further, according to the anti-vibration wheel for an automobile, the vibration damping unit is included in the spoke portion of the wheel, to attenuate vibration and noise transferred to the automobile body through the wheel and to lighten the weight of the wheel itself.

BRIEF DESCRIPTION OF THE DRAWINGS

The above and other features and advantages of the present invention will become more apparent to those of ordinary skill in the art by describing in detail the preferred embodiments thereof with reference to the attached drawings in which.

| Description of the reference numbers in the figures: | |
|---|---|
| 100: disk member | 110: hub mounting portion |
| 120: hub hole | 130: bolt hole |
| 131: securing portion | 132: insertion hole |
| 140: cavity | 150: spoke portion |
| 151: outside surface | 151b: through hole |
| 152: inside surface | 153: decorative open space |
| 154: inside surface | 160: rim member |
| 161, 161a: flanges | 162, 162a: outer/inner bead seats |
| 163: well portion | 163a, 163b: outer/inner well portions |
| 163b-1: first incline portion | 163b-2: second incline portion |
| 164: well wall | 200: tire |
| 201, 202: outer/inner beads | |
| 700: outside vibration damping plate | |
| 700a: thicker end | 700b: thinner end |
| 700c: cavity | 710: outside cap |
| 800: side vibration damping plate | 810: side cap |
| 900: damper rubber | 900a: through hole |
| F1, F2: loads | |
| R1, R2, R2', R2-1, R2-2: reaction forces | |
| ϵ1, ϵ2: amount of deformation | |
| θ1, θ2: inclination angle | |

DETAILED DESCRIPTION OF THE INVENTION

The present invention will now be described more fully hereinafter with reference to the accompanying drawings, in which the preferred embodiment(s) of the invention is shown so that those of ordinary skill in the art can easily carry out the present invention.

The terms used herein are defined in consideration of the function(s) in the present invention and therefore, these terms may vary according to the intention or practice of a user or an operator. Accordingly, the definition of these terms shall be interpreted as having their meaning and concept in the context of the technical detail to work the invention rather than the simple names of the terms.

Further, the embodiments of the present invention do not limit the scope of the present invention but are just examples of the constituent elements described in the claims of the present invention. Accordingly, the embodiments including alternative constituent elements which are included in the technical idea throughout the specification of the invention and which are alternative as the equivalents in the constituent elements of the claims can be included in the scope of the claims of the invention.

Further, terms selected in the embodiments are used to distinguish one constituent element from the other constituent element(s) and therefore, the constituent elements shall not be limited by the terms. In describing the present invention, any detailed description of the relevant publicly known technology, which makes the gist of the present invention unnecessarily obscure, will not be presented herein.

In the description of the present invention, based on an automobile body, the side of a disk member and a rim member towards the outside of the automobile body is modified using the term, "outer" or "outside", and the side of the disk member and the rim member towards the inside of the automobile body is modified using the term, "inner" or "inside". FIGS. 3 through 6 illustrate an anti-vibration wheel for an automobile according to the present invention and vibration damping units provided to spoke portions of the anti-vibration wheel for an automobile.

As shown in FIGS. 3 through 6, the anti-vibration wheel for an automobile according to the present invention includes a disk member 100 connected to an axle hub (not shown), and a rim member 160 protruding from an outer circumferential edge of the disk member 100 and mounted with a tire 200.

Figure 3:
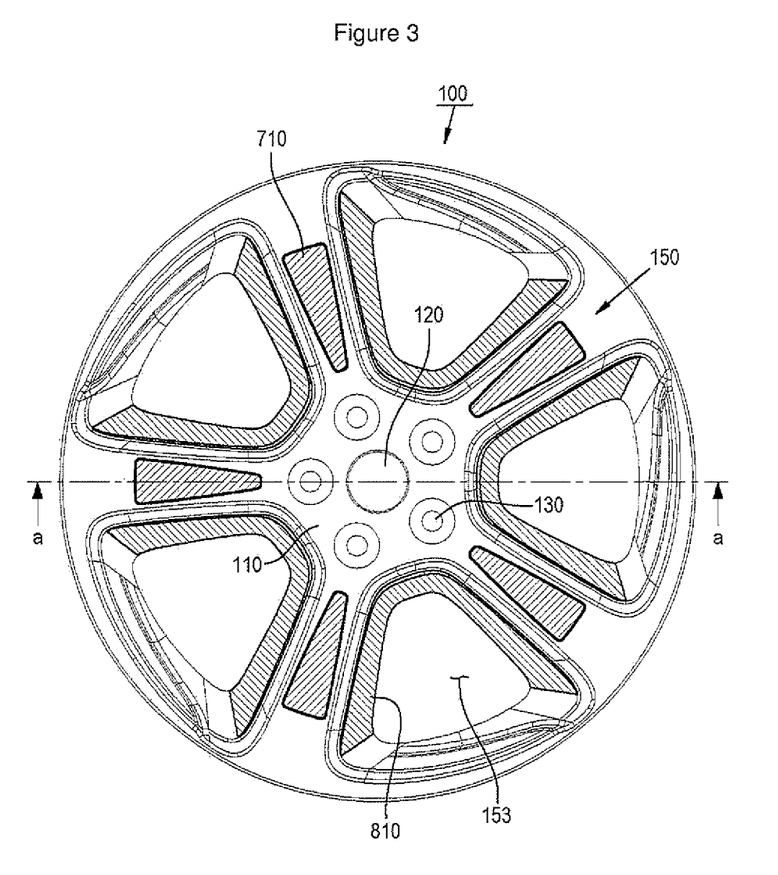
FIG. 3 is a structure view of a wheel for an automobile according to the present invention.
Figure 4:
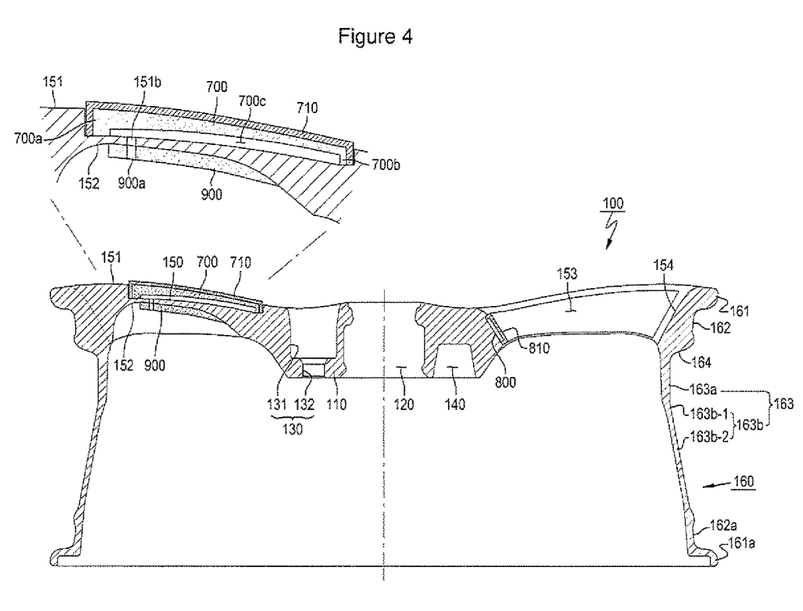
FIG. 4 is a cross-sectional view of the wheel, taken along Line a-a shown in FIG. 3.

The disk member 100 includes a hub mounting portion 110 and spoke portions 150. The hub mounting portion 110 is in a disk shape, to be connected to the axle hub. The spoke portion 150 radially extends from the outside of the hub mounting portion 110 to the rim member 160.

Specially, as shown in FIG. 3 and FIG. 4, the hub mounting portion 110 is formed in a solid type, except for a bolt hole 130 and a cavity 140, to fasten the axle hub using a bolt. In the automobile wheel, a portion connected to the axle hub (not shown) as a support end receives the load of a cantilever. Therefore, the reason to make the solid hub mounting portion 110 is for the support end to have the strength to bear the weight of the automobile itself and the impact load.

A hub hole 120 into which the axle hub is inserted is formed in the center of the hub mounting portion 110. A number of bolt holes 130 are formed, at regular intervals, in a circumferential direction, spaced apart from the hub hole 120, on the outside of the hub mounting portion 110.

Each of the bolt holes 130 comprises a securing portion 131 and an insertion hole 132. The securing portion 131 is formed on the outside surface of the disk member 100 and has a relatively wide diameter so that a nut or cap nut to be inserted from the outside is secured. The insertion hole 132 is formed by extending to the inside surface of the disk member 100 and has a relatively narrow diameter so that a bolt provided to the axle hub passes through. The bolt of the axle hub, which passes through the insertion hole 132 of the bolt hole 130, is securely connected with the nut or cap nut.

The cavity 140 is provided between the bolt holes 130. A damper (not shown) made of a rubber material may be inserted into the cavity 140. The cavity 140 is formed in the disk member 100, to be opposite to the bolt hole 130, that is, on the inside surface of the disk member 100. The cavity 140 is formed such that its diameter becomes gradually smaller from the inside surface of the disk member 100 towards the center thereof. This is to attenuate vibration and noise occurring in the wheel itself during the driving of the automobile by the cavity 140 having the diameter which becomes gradually bigger towards the inside end of the disk member 100 and the damper.

The securing portion 131 of the bolt hole 130 and the cavity 140 are positioned so as to be opposed to each other, thereby mutually reinforcing the strength of the disk member 100. That is, on the outside surface of the disk member 100, the interval between the hub hole 120 and the securing portion 131 is narrow but it is possible to maintain the strength by the solid hub mounting portion 110 where the cavity 140 is not formed. On the inside surface of the disk member 100, the interval between the hub hole 120 and the cavity 140 is narrow but it is possible to maintain the strength since the space between the hub hole 120 and the insertion hole 132 of the bolt hole 130 is wide.

When the tire 200 is mounted on the rim member 160 of the automobile wheel, a closed ring-shaped space is formed between the rim member 160 and the tire 200.

As shown in FIG. 3 and FIG. 4, the rim member 160 comprises: flanges 161, 161a, outer and inner bead seats 162, 162a, a well portion 163 and a well wall 164. The flanges 161, 161a are each positioned at the outside and inside ends of the rim member 160, to be in contact with the outside surfaces of two ends of the tire 200 by side to side. The bead seats 162, 162a each extend from the flanges 161, 161a, to be formed in a flat surface to be in contact with outer and inner beads 201, 202 of the tire 200 by side to side and to securely support the outer and inner beads 201, 202 when the tire 200 is seated on the rim member 160.

The well portion 163 is formed to have a diameter which is smaller than the diameters of the bead seats 162, 162a. This permits the outer and inner beads 201, 202 of the tire 200 in contact with the outer and inner bead seats 162, 162a by side to side to move away from the bead seats 162, 162a and into the well portion 163 for tire removal.

Figure 5:
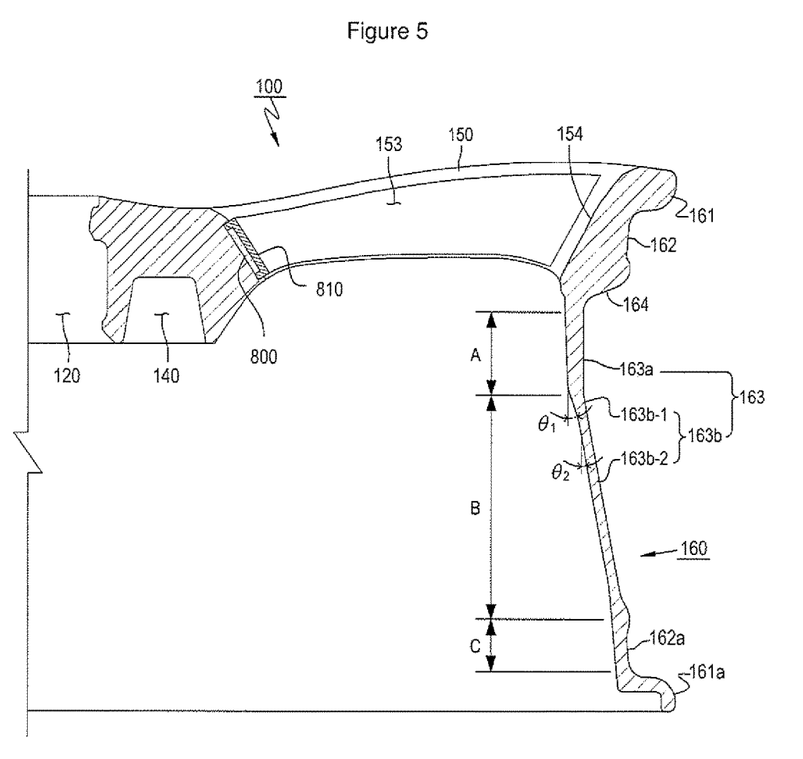
FIG. 5 is an enlarged view of a rim member of the wheel for an automobile according to present invention.
Figure 6:
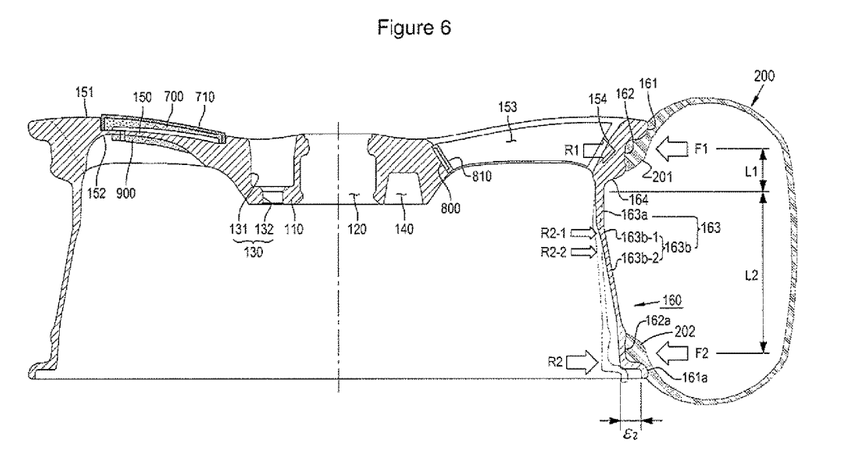
FIG. 6 shows the forces acting in the rim member of the wheel for an automobile according to present invention.

As shown in FIG. 5 and FIG. 6, the well portion 163 comprises an outer well portion 163a and an inner well portion 163b. The outer well portion 163a extends from the outer bead seat 162 and the inner well portion 163b extends from the outer well portion 163a and is connected to the inner beat seat 162a. The thickness A of the outer well portion 163a is greater than the thickness C of the inner bead seat 162a which is greater than the thickness B of the inner well portion 163b. That is, the thicknesses of these are A>C>B.

Further, as shown in FIG. 5, the inner well portion 163b is formed to be at two positions outward from the outer well portion 163a. That is, the inner well portion 163b includes a first incline portion 163b-1 which is inclined outward from the outer well portion 163a, and a second incline portion 163b-2 which is further inclined outward from the first incline portion. A first inclination angle θ1 of the first incline portion 163b-1 is greater than a second inclination angle θ2 of the second incline portion 163b-2, so that different reaction forces R2-1, R2-2 in the first and second incline portions act to the load F2 applied to the inner bead seat 162a.

Therefore, in the outer well portion 163a which has the relatively thicker thickness A than the inner beat seat 162a and the inner well portion 163b, a support surface connected to the disk member 100 is bigger and thicker than the support surface of the conventional art. Further, the inner well portion 163b is formed to be inclined at two positions from the outer well portion 163a. Therefore, as shown in FIG. 6, the amount of deformation ϵ2 of the well portion 163 and inner bead seat 162a to the loads F1, F2 applied during the driving of the automobile is less than the amount of deformation ϵ1 of the conventional art (ϵ2>ϵ1), to decrease the vibration and noise transferred to the automobile.

That is, in the present invention, since the thickness A of the outer well portion 163a connected to the disk member 100 is thicker and the outer well portion 163a is bigger than the conventional art and the inner well portion 163b is formed to be inclined at two positions from the outer well portion 163a, the reaction force R2 to the load F2 acting on the inner bead seat 162a is dispersed as reaction forces R2-1, R2-2 each acting on the first and second incline portions, thereby decreasing the moment caused by the load F2 applied to the inner well portion 163b and the inner bead seat 162a, to decrease the amount of deformation ϵ2 thereof.

Further, as shown in FIG. 3 and FIG. 4, an outer cap 710 is attachably/detachably provided to an outside surface 151 of each spoke portion 150 of the disk member 100.

The outside cap 710 may be in a round, oval or polygonal shape corresponding to the spoke portion 150. The outside cap may be formed of a plastic material. One or more outside caps 710 may be provided to the outside surface 151 of each spoke portion 150.

Further, an outside vibration damping plate 700 in the shape corresponding to the outside cap 710 is provided to the inside surface of the outside cap 710 facing the outside surface 151 of the spoke portion 150.

An insertion groove in the shape corresponding to the outside cap 710 is formed on the outside surface 151 of the spoke portion 150 provided with the outside cap 710. The outside cap 710 is inserted into the insertion groove to be connected together so that one side surface of the outside vibration damping plate 700 is in contact with the outside surface of the spoke portion 150 and the other side surface of the outside vibration damping plate 700 is in contact with the inside surface of the outside cap 710.

The outside vibration damping plate 700 is formed of compressed rubber having a uniform thickness and is positioned between the outside cap 710 and the spoke portion 150 such that the one side surface of the outside vibration damping plate 700 is in contact with the outside cap 710 and the other side surface of the outside vibration damping plate 700 is in contact with the spoke portion 150 by side to side. Therefore, the outside vibration damping plate 700 absorbs and attenuates the vibration and noise occurring in the wheel itself during the driving of the automobile.

Therefore, when the vibration is transferred to the rim member 160 through the tire 200, the outside vibration damping plate 700 provided to the outside surface 151 of the spoke portion 150 directly absorbs and efficiently attenuates the vibration concentrated to the spoke portion 150.

Further, a decorative open space 153 in a closed curve is formed between the two adjacent spoke portions 150. A side cap 810 is provided to be attached to/detached from an inside surface 154 of the decorative open space 153 (that is, the surface formed by the sides of the adjacent spoke portions 150 and the side of the hub mounting portion 110).

The side cap 810 may be formed in a round, oval or polygonal shape. However, the side cap 810 in the embodiment of the present invention is in the "U" shape corresponding to the inside surface 154 of the decorative open space 153 and is formed of a plastic material.

A side vibration damping plate 800 is insertedly and securely provided to an inside surface of the side cap 810. One surface of the side vibration damping plate 800 is in contact with the inside surface 154 of the decorative open space 153.

An insertion groove in the "U" shape corresponding to the side cap 810 is formed at the inside surface 154 of the decorative open space 153 where the side cap 810 is provided. The side cap 810 is inserted into the insertion groove to be connected together such that one side surface of the side vibration damping plate 800 is in contact with the inside surface 154 of the decorative open space 153 and the other side surface of the side vibration damping plate 800 is in contact with the inside surface of the side cap 810.

The side vibration damping plate 800 is formed of compressed rubber having a uniform thickness. The one side surface of the side vibration damping plate 800 is in contact with the side cap 810 and the other side surface of the side vibration damping plate 800 is in contact with the inside surface 154 of the decorative open space 153 by side to side. Therefore, the side vibration damping plate 800 absorbs and attenuates the vibration and noise occurring in the wheel itself during the driving of the automobile.

The side vibration damping plate 800 is provided to the spoke portion 150 of the disk member 100, together with the outside vibration damping plate 700 as described above. Therefore, the vibration which is transferred to the rim member 160 through the tire 200 and which is concentrated to the spoke portions 150 is absorbed and attenuated by the side vibration damping plate 800 and the outside vibration damping plate 700 provided to the spoke portions 150 connecting the hub mounting portion 110 and the rim member 160.

Further, a damper rubber 900 is attached and secured to the inside surface 152 of each spoke portion 150 which is opposite to the outside surface 151 of the spoke portion 150 where the outside vibration damping plate 700 is provided.

The damper rubber 900 has a round, oval or polygonal shape and is formed of a compressed rubber having a uniform thickness. The damper rubber 900 is provided to be in contact with the inside surface 152 of the spoke portion 150 by side to side, to absorb and attenuate the vibration and noise occurring in the wheel itself during the driving of the automobile.

The damper rubber 900 is provided, together with the aforementioned outside vibration damping plate 700 and side vibration damping plate 800. The vibration transferred to the rim member 160 through the tire 200 is absorbed and attenuated by the damper rubber 900, together with the side vibration damping plate 800 and the outside vibration damping plate 700 provided to the spoke portion 150.

Specially, as shown in FIG. 3 and FIG. 4, both ends of the outside vibration damping plate 700 which is provided to the outside surface 151 of each of the spoke portions 150 may be formed to be different from each other in thickness. That is, one end 700a of the outside vibration damping plate 700 is thicker relative to the opposite end 700b which is thinner.

Preferably, the thicker end 700a of the outside vibration damping plate 700 is positioned to be adjacent towards the rim member 160 and the thinner end 700b is positioned to be adjacent towards the hub mounting portion 110. The vibration of the wheel most greatly occurs in the rim member 160, and the vibration occurring in the rim member 160 is transferred to the axle hub connected to the hub mounting portion 110 through each of the spoke portions 150 and further transferred to the automobile body. Then, since the outside vibration damping plate 700 is provided to the spoke portion 150 such that the thicker end 700a of the outside vibration damping plate 700 is positioned towards the rim member 160, most of the vibration is absorbed and attenuated in the thicker end 700a of the outside vibration damping plate 700 and the remaining vibration is mostly attenuated while passing from the thicker end 700a to the thinner end 700b of the outside vibration damping plate 700.

Therefore, the vibration transferred to the rim member 160 through the tire 200 is all attenuated by the outside vibration damping plate 700 before it is transferred to the axle hub.

Further, since the thinner end 700b of the outside vibration damping plate 700 is positioned towards the hub mounting portion 110, the intensity of the hub mounting portion 110 is secured and the maximum effect of damping vibration is obtained.

The outside vibration damping plate 700 further has a Helmholtz resonance absorption function.

That is, a cavity 700c is formed in the inside surface of the outside vibration damping plate 700 facing the spoke portion 150. The cavity 700c is spaced apart from the spoke portion 150. A through hole 151b through the spoke portion 150 is operatively connected to the cavity 700c of the outside vibration damping plate 700.

Accordingly, the Helmholtz resonance absorption function is performed as the vibration and noise transferred to the cavity 700c through the outside vibration damping plate 700 are removed to the outside through the through hole 151b of the spoke portion 150.

Further, in the case where the damper rubber 900 is provided to the inside surface of the spoke portion 150, a through hole 900a aligned with the through hole 151b of the spoke portion 150 is formed in the damper rubber 900.

Specifically, the through holes 151b, 900a each have the sound wave frequency for attenuation according to the capacity, the opening diameters and lengths of an entry and exit. Therefore, the capacity, the opening diameters and lengths of the entry and exit of each of the through holes 151b, 900a are defined to enable attenuation of the sound wave at a specific frequency band (for example, 180 Hz~270 Hz) causing resonance in road noise occurring during the driving of the automobile.

Therefore, road noise and vibration occurring during the driving of the automobile is maximally reduced by the cavity 700c of the outside vibration damping plate 700, the through hole 151b of the spoke portion 150, and the through hole 900a of the damper rubber 900.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents.

Simple modifications or similar arrangements of the present invention belong to the category of the invention and therefore, the protection range of the invention will be apparent by the claims attached herewith.

What is claimed is:
1. An anti-vibration wheel for an automobile, comprising:
a disk member (100) connected to an axle hub with a rim member (160) extending from a circumferential edge of the disk member (100) for mounting a tire (200),
the rim member (160) further having:
an outer bead seat (162) positioned at an outer end of the rim member (160) where an outer bead (201) of the tire (200) sits,
an inner bead seat (162a) positioned at an inner end of the rim member (160) where an inner bead (202) of the tire (200) sits, and
a well portion (163) which is inclined and extends between the outer bead seat (162) and the inner bead seat (162a), with an outer well portion (163a) extending from the outer bead seat (162) and an inner well portion (163b) extending from the outer well portion (163a), with the thickness of the outer well portion (163a) being greater than the thickness of the inner bead seat (162a) which is greater than the thickness of the inner well portion (163b);
said anti-vibration wheel further comprising:
an outside cap (710) attachably/detachably connected to an outside surface (151) of a spoke portion (150) connecting a hub mounting portion (110) of the disk member (100) connected to the axle hub and the rim member (160); and
an outside vibration damping plate (700) provided to the outside cap (710) to be in contact with the spoke portion (150), to dampen vibration; wherein the outside vibration damping plate (700) is formed such that the thickness gradually increases from one end to the other end, where one end (700a) is thicker relative to the opposite end (700b) which is thinner, and the outside vibration damping plate (700) is positioned such that the thicker end (700a) is positioned towards the rim member (160) and the thinner end (700*b*) is positioned towards the hub mounting portion (110).

2. The anti-vibration wheel for an automobile according to claim 1, wherein the outside vibration damping plate (700) includes a cavity (700*c*) spaced apart from the spoke portion (150) on its surface facing the spoke portion (150).

3. The anti-vibration wheel for an automobile according to claim 2 wherein the spoke portion (150) includes a through hole (151*b*) being operatively connected to the cavity (700*c*) of the outside vibration damping plate (700).

4. The anti-vibration wheel for an automobile according to claim 3, further comprising:
- a side cap (810) attachably/detachably connected to an inside surface (154) of a decorative open space (153) formed two adjacent spoke portions (150) of the disk member (100); and
- a side vibration damping plate (800) provided to the side cap (810) to be in contact with the inside surface (154) of the decorative open space (153), to dampen vibration.

5. The anti-vibration wheel for an automobile according to claim 4, further comprising a damper rubber (900) provided to be in contact with an inside surface (152) of the spoke portion (150) of the disk member (100).

6. The anti-vibration wheel for an automobile according to claim 5, wherein the damper rubber (900) includes a through hole (900*a*) to be aligned with and operatively connected to the through hole (151*b*) of the spoke portion (150).

\* \* \* \* \*